US012449862B2

(12) United States Patent
Williams et al.

(10) Patent No.: US 12,449,862 B2
(45) Date of Patent: Oct. 21, 2025

(54) ELECTRONIC DEVICE HAVING FINGER RECESS ANTENNA

(71) Applicant: Apple Inc., Cupertino, CA (US)

(72) Inventors: Michael J Williams, Campbell, CA (US); Nikolaos Chiotellis, San Jose, CA (US); Joel D Barrera, Cedar Park, TX (US); Jerzy S Guterman, Sunnyvale, CA (US); Trevor J Edmonds, San Francisco, CA (US); Marc Soriano Baliarda, San Jose, CA (US); Mahmoud R Amini, Redwood City, CA (US); Soroush Kamrava, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 18/476,220

(22) Filed: Sep. 27, 2023

(65) Prior Publication Data

US 2025/0103109 A1 Mar. 27, 2025

(51) Int. Cl.
*G06F 1/16* (2006.01)
(52) U.S. Cl.
CPC .................................. *G06F 1/1681* (2013.01)
(58) Field of Classification Search
CPC combination set(s) only.
See application file for complete search history.

(56) References Cited

U.S. PATENT DOCUMENTS

| | | | | |
|---|---|---|---|---|
| 5,644,320 A | * | 7/1997 | Rossi | H01Q 1/2258 343/702 |
| 6,181,284 B1 | * | 1/2001 | Madsen | G06F 1/1656 343/702 |
| 6,717,801 B1 | * | 4/2004 | Castell | H04M 1/0254 361/679.41 |
| 6,870,733 B2 | * | 3/2005 | Castell | H04M 1/0254 361/753 |
| 8,059,039 B2 | | 11/2011 | Ayala Vazquez et al. | |
| 8,138,978 B1 | * | 3/2012 | Vier | H01Q 1/245 343/702 |
| 8,482,469 B2 | * | 7/2013 | Ayala | H01Q 9/42 343/702 |
| 8,508,418 B2 | * | 8/2013 | Kough | H01Q 1/2266 343/702 |

(Continued)

OTHER PUBLICATIONS

U.S. Appl. No. 17/832,465, filed Jun. 3, 2022.

*Primary Examiner* — Lisa Lea-Edmonds
(74) *Attorney, Agent, or Firm* — Treyz Law Group, P.C.; Michael H. Lyons

(57) ABSTRACT

An electronic device such as a laptop computer may have an upper housing and a lower housing. The upper housing may be coupled to the lower housing by a hinge. The upper housing may be rotatable relative to the lower housing between an open position and a closed position. The lower housing may have an upper metal wall, a lower metal wall, and a metal sidewall that couples the lower metal wall to the upper metal wall. The lower metal housing may have a finger scoop in the metal sidewall. The finger scoop may have a surface that is oriented at a non-parallel and non-perpendicular angle to a lateral surface of the upper housing when the upper housing is in the closed position. The device may have an antenna with a radiating slot in the surface of the finger scoop.

20 Claims, 6 Drawing Sheets

(56) References Cited

U.S. PATENT DOCUMENTS

| | | |
|---|---|---|
| 9,450,289 B2 | 9/2016 | Guterman et al. |
| 9,531,071 B2 | 12/2016 | Guterman et al. |
| 9,653,777 B2 | 5/2017 | Guterman et al. |
| 10,268,236 B2 | 4/2019 | Guterman et al. |
| 10,727,590 B2 | 7/2020 | Barrera et al. |
| 10,978,806 B2 | 4/2021 | Garrido Lopez et al. |
| 12,216,493 B2 * | 2/2025 | Choi ................. G06F 1/1616 |
| 2006/0244663 A1 * | 11/2006 | Fleck ................ G06F 1/1698 343/702 |
| 2009/0168316 A1 * | 7/2009 | Goto ................. G06F 1/1616 361/679.55 |
| 2009/0262029 A1 * | 10/2009 | Chiang ............. H01Q 1/2266 343/702 |
| 2010/0073243 A1 | 3/2010 | Ayala Vazquez et al. |
| 2012/0026048 A1 | 2/2012 | Vazquez et al. |
| 2015/0062794 A1 * | 3/2015 | Hirai ................. G06F 1/1679 361/679.55 |
| 2017/0212554 A1 * | 7/2017 | Guterman .......... G06F 1/1681 |
| 2020/0381801 A1 * | 12/2020 | Oh .................... H01Q 1/2266 |
| 2023/0223681 A1 | 7/2023 | Barrera et al. |
| 2025/0103109 A1 * | 3/2025 | Williams ........... G06F 1/1681 |

* cited by examiner

US 12,449,862 B2

ELECTRONIC DEVICE HAVING FINGER RECESS ANTENNA

FIELD

This relates generally to electronic devices, including electronic devices with wireless communications capabilities.

BACKGROUND

Electronic devices such as portable computers and cellular telephones are often provided with wireless communications capabilities and displays. To satisfy consumer demand for small form factor wireless devices, manufacturers are continually striving to implement wireless communications circuitry such as antenna components using compact structures.

It can be challenging to form electronic device antenna structures with desired attributes. In some wireless devices, the presence of conductive housing structures can impact antenna performance. Device size can also affect performance. It can be difficult to achieve desired performance levels in a compact device, particularly when the compact device has conductive housing structures.

SUMMARY

An electronic device such as a laptop computer may have an upper housing and a lower housing. The upper housing may be coupled to the lower housing by a hinge. The upper housing may be rotatable relative to the lower housing between an open position and a closed position. The lower housing may have an upper metal wall, a lower metal wall, and a metal sidewall that couples the lower metal wall to the upper metal wall. The lower metal housing may have a finger scoop in the metal sidewall. The finger scoop may be located along an edge of the lower housing where the metal sidewall meets the upper metal wall.

The finger scoop may have a surface that is oriented at a non-parallel and non-perpendicular angle to a lateral surface of the upper housing when the upper housing is in the closed position. The device may have an antenna. The antenna may have a radiating slot in the surface of the finger scoop. The antenna may include a cavity in the lower housing and overlapping the radiating slot. The antenna may include a tunnel that extends from the radiating slot to an opening in the lower metal wall. The antenna may convey radio-frequency signals at a user-facing side of the device while minimizing risk of the user blocking the radio-frequency signals while interacting with the device.

DETAILED DESCRIPTION

Figure 1:
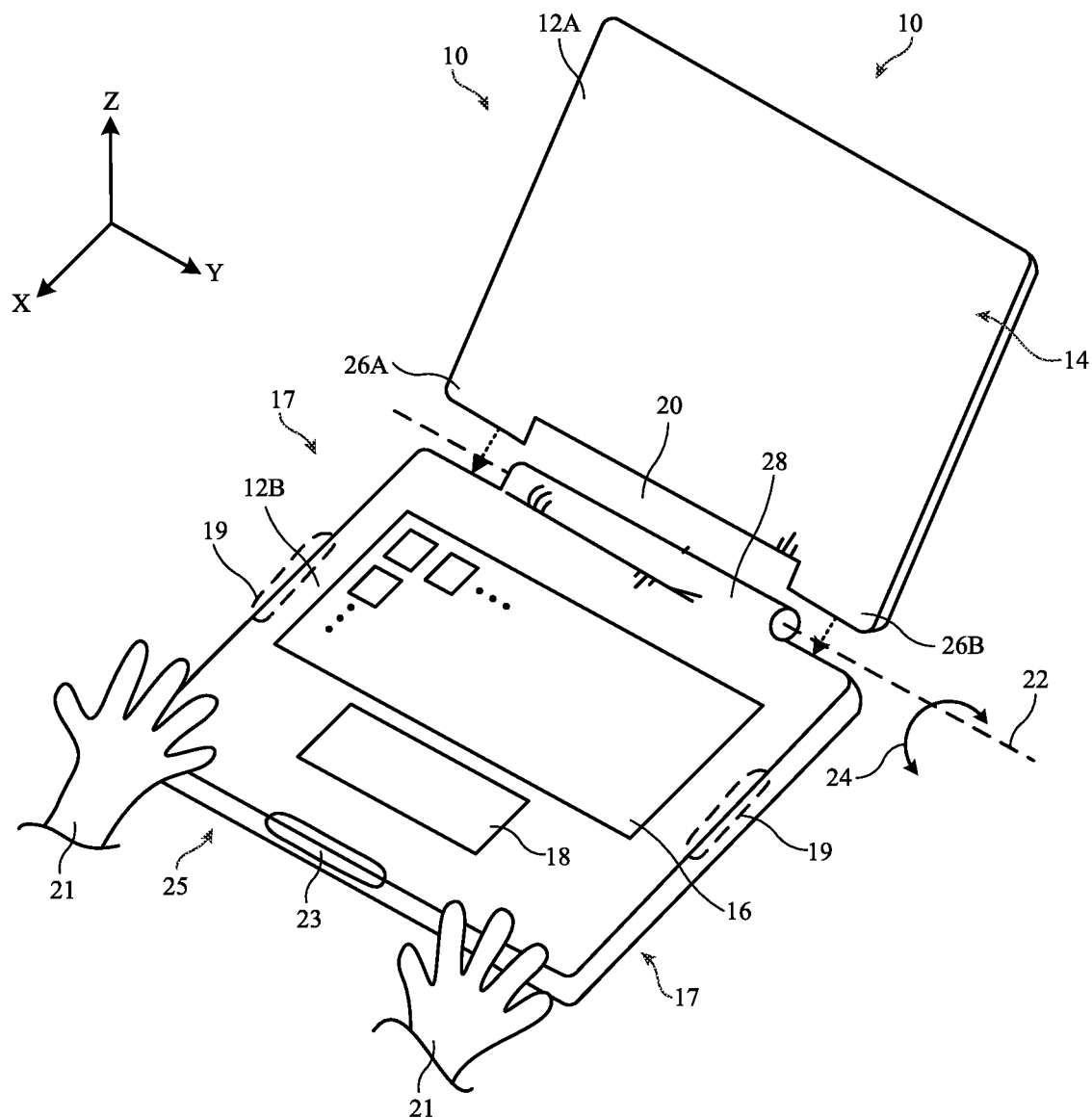
FIG. 1 is a perspective view of an illustrative electronic device such as a laptop computer having a finger-receiving recess in accordance with some embodiments.

An electronic device such as electronic device 10 of FIG. 1 may contain wireless circuitry. For example, electronic device 10 may contain wireless communications circuitry that operates in long-range communications bands such as cellular telephone bands and wireless circuitry that operates in short-range communications bands such as the 2.4 GHZ Bluetooth® or other wireless personal area network (WPAN) bands and the 2.4 GHz and 5 GHz Wi-Fi® band or other wireless local area network (WLAN) bands (sometimes referred to as IEEE 802.11 bands or wireless local area network communications bands). Device 10 may also contain wireless communications circuitry for performing near-field communications, communications at millimeter/centimeter wave frequencies, light-based wireless communications, satellite navigation system communications, or other wireless communications.

Device 10 may be a handheld electronic device such as a cellular telephone, media player, gaming device, or other device, may be a laptop computer, tablet computer, or other portable computer, may be a desktop computer, may be a computer display, may be a display containing an embedded computer, may be a television or set top box, wireless base station, wireless access point, home entertainment console, portable speaker, gaming accessory, wristwatch device, head-mounted display device, or other wearable device, or may be other electronic equipment. Configurations in which device 10 has a rotatable lid as in a portable (e.g., laptop) computer are sometimes described herein as an example. This is, however, merely illustrative. Device 10 may be any suitable electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

As shown in FIG. 1, device 10 may have input-output devices such as track pad 18 (e.g., a touch pad, mouse, other touch-based user input device) and keyboard 16 (e.g., having a set of mechanical and/or electronic-based keys and/or a touch screen display). Device 10 may also have components such as cameras, microphones, speakers, buttons, status indicator lights, buzzers, sensors, and other input-output devices. These devices may be used to gather input for device 10 and may be used to supply a user of device 10 with output. Connector ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Device 10 may include a display such a display 14. Display 14 may be a liquid crystal display (LCD), a plasma display, an organic light-emitting diode (OLED) display, an electrophoretic display, or a display implemented using other display technologies. A touch sensor may be incorporated into display 14 (e.g., display 14 may be a touch screen display) or display 14 may be insensitive to touch. Touch sensors for display 14 may be resistive touch sensors, capacitive touch sensors, acoustic touch sensors, light-based touch sensors, force sensors, or touch sensors implemented using other touch technologies.

Device 10 may have a one-piece housing or a multi-piece housing. As shown in FIG. 1. for example, electronic device 10 may be a device such as a portable computer or other device that has a two-part housing formed from an upper housing portion such as upper housing 12A and a lower housing portion such as lower housing 12B. Upper housing 12A may include display 14 and may sometimes be referred to as a display housing or lid. Lower housing 12B may sometimes be referred to as a base housing or main housing.

Housings 12A and 12B may be connected to each other using hinge structures located along the upper edge of lower housing 12B and the lower edge of upper housing 12A. For example, housings 12A and 12B may be coupled by hinges 26 such as hinges 26A and 26B that are located at opposing left and right sides of housing 12 along a rotational axis such as axis 22 (sometimes referred to herein as hinge axis 22). A slot-shaped opening such as opening 20 may be formed between upper housing 12A and lower housing 12B and may be bordered on either end by hinges 26A and 26B.

Opening 20 is sometimes also referred to herein as gap 20 or slot 20 between upper housing 12A and lower housing 12B. Hinges 26A and 26B, which may be formed from conductive structures such as metal structures, may allow upper housing 12A to rotate about axis 22 in directions 24 relative to lower housing 12B. Slot 20 extends along the rear edge of lower housing 12B parallel to axis 22. The lateral plane of upper housing (lid) 12A and the lateral plane of lower housing 12B may be separated by an angle that varies between 0° when the lid is closed to 90°, 140°, 160°, 180° or more when the lid is fully opened.

Some of the structures in housing 12 may be conductive. For example, upper housing 12A and lower housing 12B may include conductive housing structures such as metal housing walls. Lower housing 12B may include a clutch barrel along hinge axis 22 such as clutch barrel 28. Clutch barrel 28 may extend outwards from metal housing walls of lower housing 12B towards upper housing 12A (e.g., within slot 20). When upper housing 12A is attached to lower housing 12B, hinges 26A and 26B may be affixed to opposing ends of clutch barrel 28 (e.g., clutch barrel 28 may be laterally opposed to hinges 26A and 26B). Clutch barrel 28 may include springs and/or other clutch mechanisms that allow hinges 26A and 26B and thus upper housing 12A to rotate relative to lower housing 12B about hinge axis 22, while also mechanically holding upper housing 12A in place at a desired angle or orientation relative to lower housing 12B (e.g., intermediate angles between an open position and a closed position of upper housing 12A). Clutch barrel 28 may have walls that are formed from dielectric material and/or metal materials.

Upper housing 12A may be rotatable about hinge axis 22 between an open position (as shown in FIG. 1) and a closed position. In the closed position, the lateral surface of display 14 and upper housing 12A faces and overlaps the lateral surface of lower housing 12B (e.g., keyboard 16). When in the closed position, the peripheral housing walls of upper housing 12A (e.g., surrounding the lateral periphery of display 14) may lie flush with the peripheral housing walls of lower housing 12B (e.g., surrounding the lateral periphery of keyboard 16). This can make it difficult for a user to be able to provide suitable torque to upper housing 12A to move (open) upper housing 12A from the closed position to the open position.

As such, device 10 may include one or more finger-receiving recesses in the housing walls of lower housing 12B and/or upper housing 12A, such as finger scoop 23 in lower housing 12B. Finger scoop 23 may include a recessed, indented, notched, or angled portion of one or more housing walls of lower housing 12B (e.g., a recess, indentation, notch, or cavity in the one or more housing walls) that allows a force to be applied to upper housing 12A (e.g., a torque about hinge axis 22) that opens upper housing 12A from the closed position. In other words, finger scoop 23 may receive a user's finger or any other source of torque, allowing the user to open upper housing 12A. Finger scoop 23 is sometimes also referred to herein as finger recess 23, finger-receiving recess 23, recess 23, scoop 23, notch 23, indentation 23, cavity 23, finger-receiving notch 23, finger-receiving indentation 23, or finger-receiving cavity 23.

In general, lower housing 12B may include any desired number of finger scoops 23 along any desired edges of the lower housing. For example, lower housing 12B may include a finger scoop 23 along a user-facing edge (side) 25 of lower housing 12B (opposite upper housing 12A) or along one or more edges (sides) 17 (e.g., left and right edges of lower housing 12B) extending from user-facing edge 25 to upper housing 12A (e.g., at locations 19). Additionally or alternatively, upper housing 12B may include one or more finger scoops 23 along one or more of edges 25 and/or 17. In one implementation that is described herein as an example, finger scoop 23 is disposed on lower housing 12B at the center of user-facing edge 25 (e.g., overlapping a central axis of lower housing 12B parallel to the X-axis).

To ensure that antenna structures in device 10 function properly, care should be taken when placing the antenna structures relative to the conductive portions of housing 12. In implementations where upper housing 12A and lower housing 12B include metal housing walls, if care is not taken, the metal in the metal housing walls can block the antennas from conveying radio-frequency signals with free space in one or more positions of upper housing 12A relative to lower housing 12B. Care should also be taken to ensure that the user's body does not block or detune the antenna while the user interacts with device 10. To mitigate these issues and optimize antenna performance, device 10 may include an antenna formed from, disposed within, and/or overlapping finger scoop 23. Disposing the antenna at finger scoop 23 also serves to minimize the chance that a user's hands/arms 21 will block the antenna while interacting with device 10, because hands/arms 21 will most often extend around either side of finger scoop 23 while the user interacts with track pad 18 and/or keyboard 16.

Figure 2:
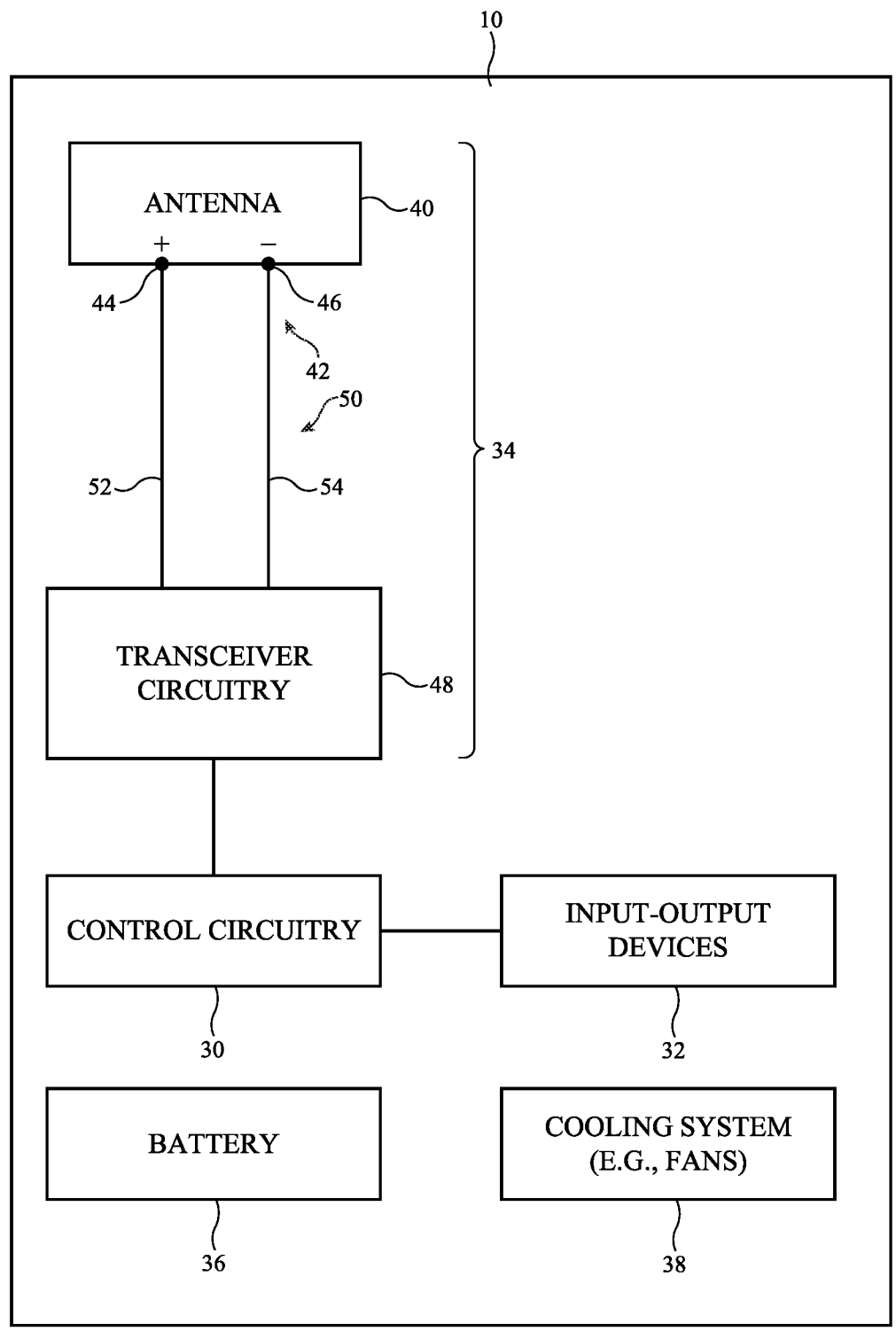
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry such as control circuitry 30. Control circuitry 30 may include storage and/or processing circuitry. Storage in control circuitry 30 may include hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 30 may be used to control the operation of device 10. This processing circuitry may include one or more processors such as microprocessors, microcontrollers, digital signal processors, host processors, baseband processor integrated circuits, application specific integrated circuits, central processing units (CPUs), graphics processing units (GPUs), etc. Control circuitry 30 may be configured to perform operations in device 10 using hardware (e.g., dedicated hardware or circuitry), firmware, and/or software. Software code for performing operations in device 10 may be stored on control circuitry 30 (e.g., storage in control circuitry 30 may include non-transitory (tangible) computer readable storage media that stores the software code). The software code may sometimes be referred to as program instructions, software, data, instructions, or code. Software code stored on the storage may be executed by processing circuitry in control circuitry 30.

Control circuitry 30 may be used to run software on device 10 such as internet browsing applications, voice-over-internet-protocol (VOIP) telephone call applications, email applications, media playback applications, operating system functions, etc. To support interactions with external equipment, control circuitry 30 may be used in implementing communications protocols. Communications protocols that may be implemented using control circuitry 30 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers, proximity sensors, and other sensors and input-output components.

Device 10 may include wireless communications circuitry 34 that allows control circuitry 30 of device 10 to communicate wirelessly with external equipment. The external equipment with which device 10 communicates wirelessly may be a computer, a cellular telephone, a watch, a router, access point, or other wireless local area network equipment, a wireless base station in a cellular telephone network, a display, a head-mounted device, or other electronic equipment. Wireless communications circuitry 34 may include radio-frequency (RF) transceiver circuitry 48 and one or more antennas such as antenna 40. Configurations in which device 10 contains a single antenna may sometimes be described herein as an example. In general, device 10 may include any number of antennas.

Transceiver circuitry 48 may support communications in Extremely High Frequency (EHF) or millimeter wave communications bands between about 30 GHz and 300 GHz, in centimeter wave communications bands between about 10 GHZ and 30 GHZ (sometimes referred to as Super High Frequency (SHF) bands), wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHZ), a cellular midband (MB) (e.g., from 1700 to 2200 MHZ), a cellular high band (HB) (e.g., from 2300 to 2700 MHZ), a cellular ultra-high band (UHB) (e.g., from 3300 to 5000 MHz, or other cellular communications bands between about 600 MHz and about 10 THz (e.g., 3G bands, 4G LTE bands, 5G New Radio (NR) Frequency Range 1 (FR1) bands below 10 GHZ, 5G NR FR2 bands between around 10 GHz and 100 GHZ, sub-THz, THz, or THE bands between around 100 GHZ and 10 THz such as 6G bands, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHZ and/or a second UWB communications band at 8.0 GHZ), and/or any other desired communications bands. The communications bands handled by the radio-frequency transceiver circuitry may sometimes be referred to herein as frequency bands or simply as "bands," and may span corresponding ranges of frequencies. Transceiver circuitry 48 may include one or more integrated circuits, power amplifier circuitry, low-noise input amplifiers, passive radio-frequency components, switching circuitry, transmission line structures, and other circuitry for handling radio-frequency signals.

If desired, device 10 may be supplied with a battery such as battery 36. Control circuitry 30, input-output devices 32, wireless communications circuitry 34, and power management circuitry associated with battery 36 may produce heat during operation. To ensure that these components are cooled satisfactorily, device 10 may be provided with a cooling system such as cooling system 38. Cooling system 38, which may sometimes be referred to as a ventilation system, may include one or more fans and other equipment for removing heat from the components of device 10. Cooling system 38 may include structures that form airflow ports (e.g., openings in ventilation port structures located along slot 20 of FIG. 1 or other portions of device 10 through which cool air may be drawn by one or more cooling fans and through which air that has been warmed from heat produced by internal components may be expelled). Airflow ports, which may sometimes be referred to as cooling ports, ventilation ports, air exhaust and entrance ports, etc., may be formed from arrays of openings in plastic ventilation port structures or other structures associated with cooling system 38.

Radio-frequency transceiver circuitry 48 and antenna(s) 40 may be used to handle one or more radio-frequency communications bands. For example, circuitry 48 may include wireless local area network transceiver circuitry that may handle a 2.4 GHz band for WiFi® and/or Bluetooth® communications and, if desired, may include 5 GHz transceiver circuitry (e.g., for WiFi®). If desired, transceiver circuitry 48 and antenna(s) 40 may handle communications in other bands (e.g., cellular telephone bands, near field communications bands, bands at millimeter wave frequencies, etc.).

Transceiver circuitry 48 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, dielectric resonator antennas, hybrids of these designs, etc. If desired, one or more of antennas 40 may be cavity-backed antennas. Different types of antennas may be used for different bands and combinations of bands. If desired, antennas 40 may be arranged in one or more phased antenna arrays.

As shown in FIG. 2, transceiver circuitry 48 in wireless communications circuitry 34 may be coupled to antennas such as antenna 40 using radio-frequency transmission line paths such as transmission line 50. Transmission line paths in device 10 such as transmission line 50 may include coaxial cables, microstrip transmission lines, stripline transmission lines, edge-coupled microstrip transmission lines, edge-coupled stripline transmission lines, waveguide transmission lines (e.g., coplanar waveguides, grounded coplanar waveguides, etc.), transmission lines formed from combinations of transmission lines of these types, etc.

Transmission line paths in device 10 such as transmission line 50 may be integrated into rigid and/or flexible printed circuit boards if desired. In one suitable arrangement, transmission line paths in device 10 may include transmission line conductors (e.g., signal and/or ground conductors) that are integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Transmission line 50 in device 10 may be coupled to antenna feed 42 of antenna 40. Antenna 40 of FIG. 2 may, for example, form an inverted-F antenna, a planar inverted-F antenna, a slot antenna, a hybrid inverted-F slot antenna or other antenna having an antenna feed such as antenna feed 42 with a positive antenna feed terminal such as positive antenna feed terminal 44 and a ground antenna feed terminal such as ground antenna feed terminal 46. Transmission line 50 may include a positive transmission line conductor 52 (sometimes referred to herein as signal conductor 52) and a ground transmission line conductor 54 (sometimes referred to herein as ground conductor 54). Signal conductor 52 may be coupled to positive antenna feed terminal 44 and ground conductor 54 may be coupled to ground antenna feed terminal 46. Other types of antenna feed arrangements may be used (e.g., indirect feed arrangements, feed arrangements in which antenna 40 is fed using multiple feeds, etc.) and multiple antennas 40 may be provided in device 10, if desired. The feeding configuration of FIG. 2 is merely illustrative.

Filter circuitry, switching circuitry, impedance matching circuitry, and other circuitry may be interposed within transmission line 50, in or between parts of antenna 40, or in other portions of wireless communications circuitry 34, if desired. Control circuitry 30 may be coupled to transceiver circuitry 48 and input-output devices 32. During operation, input-output devices 32 may supply output from device 10 and may receive input from sources that are external to device 10. Control circuitry 30 may use wireless communications circuitry 34 to transmit and receive wireless signals.

Figure 3:
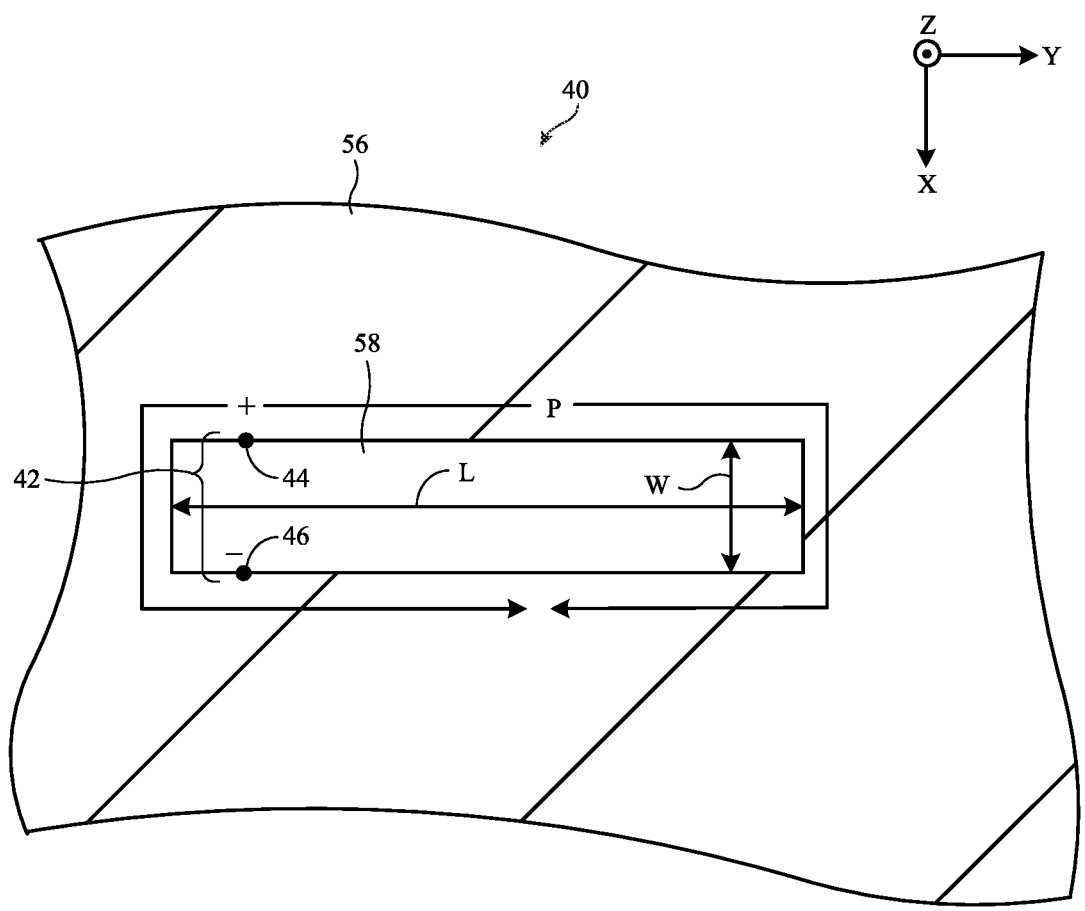
FIG. 3 is a diagram of an illustrative antenna having a radiating slot in accordance with some embodiments.

FIG. 3 is a top view of an illustrative antenna 40 for device 10. In the example of FIG. 3, antenna 40 is a slot antenna having a slot antenna resonating element 58 in an antenna ground 56 (sometimes referred to herein as ground plane 56, ground structures 56, antenna ground structures 56, or ground 56). Antenna ground 56 is formed from conductive materials such as metal portions or walls of lower housing 12B (e.g., at and/or around finger scoop 23 of FIG. 1). Slot antenna resonating element 58 is formed from a slot, notch, opening, or hole in antenna ground 56. Slot antenna resonating element 58 may be filled with air or another dielectric material.

Slot antenna resonating element 58 is sometimes also referred to herein as radiating slot 58, resonating slot 58, antenna slot 58, slot element 58, radiating slot element 58, resonating slot element 58, or simply as slot 58. In the configuration of FIG. 3, slot 58 is a closed slot, because portions of antenna ground 56 completely surround and enclose the lateral periphery of slot 58. Open slot antenna structures may also be formed in conductive materials such as antenna ground 56 (e.g., by forming an opening in the right-hand or left-hand end of antenna ground 56 so that slot 58 protrudes through antenna ground 56).

Antenna 40 may be fed by an antenna feed 42 coupled across slot 58. Positive antenna feed terminal 44 may be coupled to a first edge of slot 58 (e.g., along the length L of slot 58). Ground antenna feed terminal 46 may be coupled to a second edge of slot 58 (e.g., along the length L of slot 58) opposite the first edge. Slot 58 is an elongated slot having a longest dimension (length L) extending along a corresponding longitudinal axis (e.g., parallel to the Y-axis). Slot 58 has a width W orthogonal to length L. Width W is substantially less than length L.

In general, the frequency response of an antenna is related to the size and shape of the conductive structures in the antenna. Slot antenna structures of the type shown in FIG. 3 tend to exhibit response peaks when slot perimeter P is equal to the wavelength of operation of the antenna (e.g., where perimeter P is equal to two times length L plus two times width W). Antenna currents may flow between antenna feed terminals 44 and 46 around perimeter P of slot 58. The distance between antenna feed 42 and the narrower edge of slot 58 may be selected to match the impedance of antenna 40 to the impedance of the corresponding transmission line (e.g., transmission line 50 of FIG. 2).

In scenarios where slot 58 is a closed slot, length L may be approximately equal to (e.g., within 15% of) one-half of a wavelength of operation of the antenna (e.g., a wavelength of a fundamental mode of the antenna). Harmonic modes of slot 58 may also be configured to cover desired frequency bands. In scenarios where slot 58 is an open slot, length L may be approximately equal to one-quarter of the wavelength of operation.

The frequency response of slot 58 can be tuned using one or more tuning components and/or impedance matching circuitry (not shown). These components may have terminals that are coupled to opposing sides of slot 58 and/or to antenna feed 42. The example of FIG. 3 is merely illustrative. In general, slot 58 may have any desired shape (e.g., where the perimeter P of slot 58 defines radiating characteristics of the antenna). For example, slot 58 may have a meandering shape with any desired number of straight and/or curved segments and/or may have any desired number of straight and/or curved edges defined by antenna ground 56.

In the example of FIG. 3, slot 58 is illustrated as a two dimensional planar slot that is confined to a single two-dimensional plane (e.g., the X-Y plane). If desired, slot 58 may also have a non-zero height and may extend along a third dimension (e.g., parallel to the Z-axis). In these implementations, slot 58 is sometimes also referred to as a three-dimensional radiating slot. The three-dimensional radiating slot may be integrated into conductive structures of lower housing 12B (e.g., at finger scoop 23 of FIG. 1) and may include a tunnel or shaft in the conductive structures that extend to an additional opening in the conductive structures.

Figure 4:
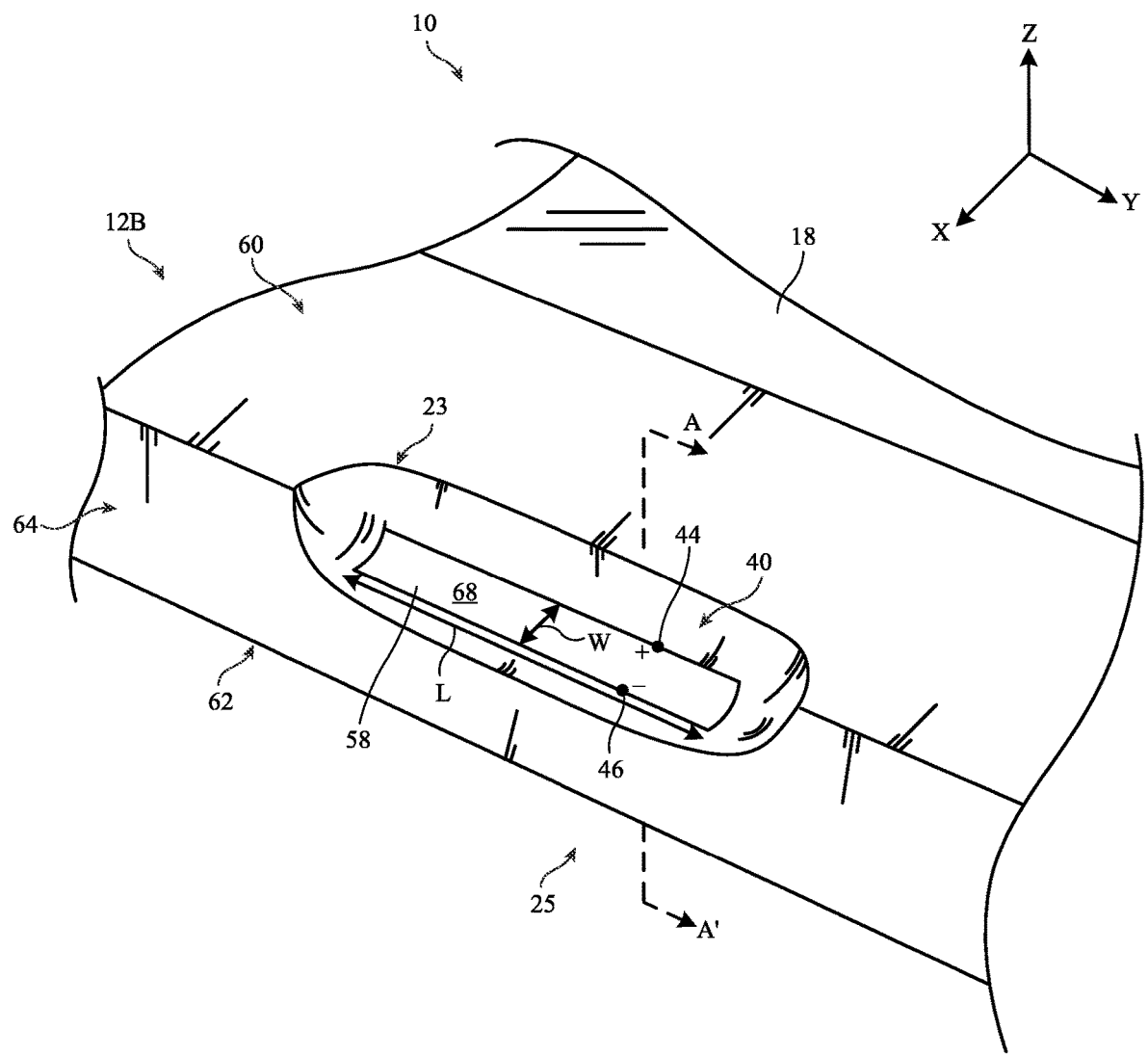
FIG. 4 is a perspective view of an illustrative antenna having a radiating slot in a finger-receiving recess in accordance with some embodiments.

FIG. 4 is a perspective view showing one example of how slot 58 may be formed from finger scoop 23 in lower housing 12B (e.g., in an implementation where finger scoop 23 is disposed along user-facing edge 25 of device 10 and overlapping the central axis of lower housing 12B of FIG. 1). Finger scoop 23 may equivalently be disposed at other locations on device 10 (e.g., locations 19 of FIG. 1, in upper housing 12A of FIG. 1, etc.).

As shown in FIG. 4, lower housing 12B may include an upper metal wall 60 (e.g., in a first plane parallel to the X-Y plane), an opposing lower metal wall 62 (e.g., in a second plane parallel to the X-Y plane), and a metal sidewall 64 that extends vertically from lower metal wall 62 to upper metal wall 60 (e.g., in a third plane orthogonal to the first and second planes and parallel to the Y-Z plane). Metal walls 60, 62, and 64 may define the edges of an interior volume of lower housing 12B.

Upper metal wall 60 may define an upper metal surface of lower housing 12B and is therefore sometimes also referred to herein as upper metal surface 60. Lower metal wall 62 may define a lower metal surface of lower housing 12B and is therefore sometimes also referred to herein as lower metal surface 62. Metal sidewall 64 may define peripheral metal surface of lower housing 12B and is therefore sometimes also referred to herein as peripheral metal surface 64 or peripheral metal wall 64. Metal sidewall 64 may extend around the lateral periphery of lower housing 12B and the lateral edges of metal walls 60 and 62. If desired, metal sidewall 64, upper metal wall 60, and/or lower metal wall 62 may be formed from respective integral portions of a single piece of metal such as anodized aluminum, stainless steel, or titanium (e.g., in a unibody configuration of lower housing 12B).

Finger scoop 23 may include a cavity, scoop, recess, or indentation in the edge (corner) of lower housing 12B where upper metal wall 60 meets metal sidewall 64. Finger scoop 23 may include an angled surface such as angled surface 66 (e.g., a recessed or indented surface). Angled surface 66 may extend non-parallel and/or non-perpendicular with respect to upper metal wall 60, lower metal wall 62, and/or metal sidewall 64. Angled surface 66 may be planar or may be curved (e.g., continuously curved, freeform curved, curved with a compound curvature, etc.). Angled surface 66 may be formed from an integral and bent/angled portion of metal sidewall 64 and/or upper metal wall 60. Finger scoop 23 may receive the user's finger or another source of force that allows the user to open upper housing 12A (FIG. 1) when upper housing 12A is in the closed position and overlapping lower housing 12B.

As shown in FIG. 4, slot 58 of antenna 40 may be formed in angled surface 66 of finger scoop 23. The edges of slot 58 may be defined by the conductive material in angled surface 66. As such, slot 58 may lie in an angled surface relative to upper metal wall 60, lower metal wall 62, and metal sidewall 64 (e.g., slot 58 may lie in a curved surface when angled surface 66 is a curved surface). The length L of slot 58 may extend parallel to the Y-axis, the hinge axis of device 10, and/or the edge where metal sidewall 64 meets upper metal wall 60. The width W of slot 58 may extend parallel to the X-axis (e.g., orthogonal to the edge where metal sidewall 64 meets upper metal wall 60).

Slot 58 may be fed by positive antenna feed terminal 44 and ground antenna feed terminal 46 coupled to the conductive material of angled surface 66 on opposing sides of slot 58. A corresponding transmission line within the interior volume of lower housing 12B may be coupled to antenna feed terminals 44 and 46. Slot 58 may transmit and/or receive radio-frequency signals through finger scoop 23. Given the central location of slot 58 along user-facing edge 25, the user is unlikely to block antenna 40 while interacting with trackpad 18 and/or keyboard 16 (FIG. 1) of device 10.

Figure 5:
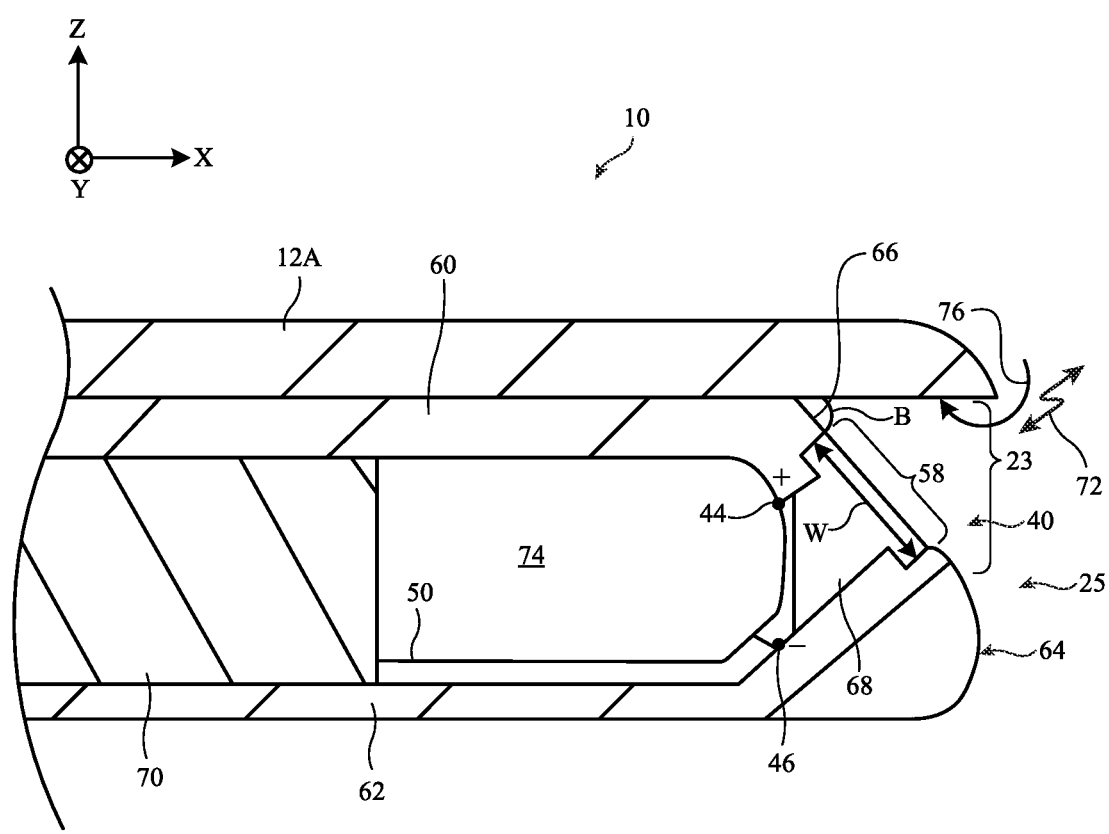
FIG. 5 is a cross-sectional side view of an illustrative electronic device having an antenna with a radiating slot in a finger-receiving recess in accordance with some embodiments.

FIG. 5 is a cross-sectional side view of slot 58 in finger scoop 23 when upper housing 12A is in the closed position (e.g., as taken in the direction of line AA' of FIG. 4). As shown in FIG. 5, when in the closed position, the lateral surface of lower housing 12A lies on and/or extends along (e.g., parallel to) upper metal wall 60 of lower housing 12B. Upper housing 12A may include conductive structures (e.g., conductive portions of display 14 of FIG. 1 such as a conductive display frame, conductive portions of a flexible printed circuit for the display, conductive shielding structures, etc., and/or metal housing walls of upper housing 12A that form one or more exterior surfaces of upper housing 12A).

In the absence of finger scoop 23, the peripheral edge of upper housing 12A (e.g., parallel to the Y-Z plane) is aligned with and lies flush with metal sidewall 64 of lower housing 12B. This prevents the user from being able to easily provide an upward force on upper housing 12A to torque upper housing 12A open about hinge axis 22 (FIG. 1). On the other hand, the angled surface 66 of finger scoop 23 may be oriented at an angle B relative to the lateral surface of upper housing 12A when upper housing 12A is closed. When closed, the lateral surface of upper housing 12A overlaps finger scoop 23. Angle B may be non-parallel and non-perpendicular with respect to the lateral surface of upper housing 12A and the lateral surface of upper metal wall 60 (e.g., angle B may be 45 degrees, 30 degrees, 60 degrees, 30-60 degrees, 20-70 degrees, etc.). This serves to recess finger scoop into conductive sidewall 64 (e.g., extending towards the interior volume of lower housing 12B). In the example of FIG. 5, angled surface 66 is illustrated as a planar surface oriented at angle B for the sake of simplicity. If desired, angled surface 66 may also be curved.

The recess formed by finger scoop 23 may allow finger scoop 23 to receive the user's finger (or another source of force/torque), allowing the user's finger to press or grab upwards on upper housing 12A from within finger scoop 23 (as shown by arrow 76). This allows an upwards force to be applied on upper housing 12A from within finger scoop 23 (e.g., in the +Z direction), which applies a corresponding torque to upper housing 12A about hinge axis 22 (FIG. 1), causing upper housing 12A to move to the open position relative to lower housing 12B.

As shown in FIG. 5, lower housing 12B may include internal conductive structures 70 (sometimes also referred to herein as internal conductors 70 or internal conductor 70). Internal conductive structures 70 may include portions of one or more of the metal walls of lower housing 12B, portions of an internal conductive frame of device 10, ground structures (e.g., conductive traces on a flexible printed circuit or a rigid printed circuit board), conductive portions of one or more device components (e.g., conductive brackets, a device battery, ground portions of device components, conductive fan components, conductive track pad components, conductive speaker components, etc.), conductive interconnect structures (e.g., conductive brackets, conductive clips, conductive springs, conductive pins, conductive adhesive, conductive foam, conductive gaskets, solder, welds, etc.), and/or any other desired conductive structures within lower housing 12B.

Internal conductive structures 70, upper metal wall 60, lower metal wall 62, and/or metal sidewall 64 of lower housing 12B may define the edges of an internal cavity in lower housing 12B such as cavity 74. Cavity 74 may be filled with air or another dielectric material. As another example, cavity 74 may form a speaker cavity for a speaker on device 10.

Slot 58 may be disposed (e.g., cut, etched, stamped, punched, etc.) in angled surface 66 of finger scoop 23. The slot may also extend vertically into the interior of device 10. For example, slot 58 may overlap cavity 74 and may extend from the exterior of lower housing 12B to cavity 74. The transmission line 50 for antenna 40 may extend from the interior of lower housing 12B (e.g., within cavity 74) towards slot 58. Transmission line 50 may be coupled to positive antenna feed terminal 44 and ground antenna feed terminal 46 on opposing sides of slot 58. Antenna current may flow around the lateral edges of slot 58 (e.g., the conductive material of angled surface 66, upper metal wall 60, and/or lower metal wall 62). Slot 58 may transmit and/or receive radio-frequency signals over a corresponding field of view out user-facing edge 25 of device 10, as shown by arrow 72.

If desired, cavity 74 may form a radio-frequency antenna cavity for slot 58 (e.g., slot 58 may be a cavity-backed slot and antenna 40 may be a cavity-backed slot antenna). Cavity 74 may, for example, help to reflect some of the radio-frequency signals conveyed by antenna 40 towards slot 58, thereby improving the gain of the antenna. Additionally or alternatively, cavity 74 may contribute one or more resonant electromagnetic cavity modes to antenna 40 that contribute to the overall radiative/resonant response of antenna 40. In these example, the edges of cavity 74 may be shaped and spaced to produce suitable boundary conditions of the electromagnetic cavity modes.

If desired, slot 58 may be filled with a dielectric filler material such as dielectric material 68 (e.g., plastic, epoxy, glass, etc.). Dielectric material 68 may help to prevent detuning of antenna 40 and/or may help to prevent moisture or contaminants from entering the interior of device 10. Additionally or alternatively, a dielectric cover layer (not shown) may be layered over angled surface 66 within finger scoop 23 to help protect slot 58.

Figure 6:
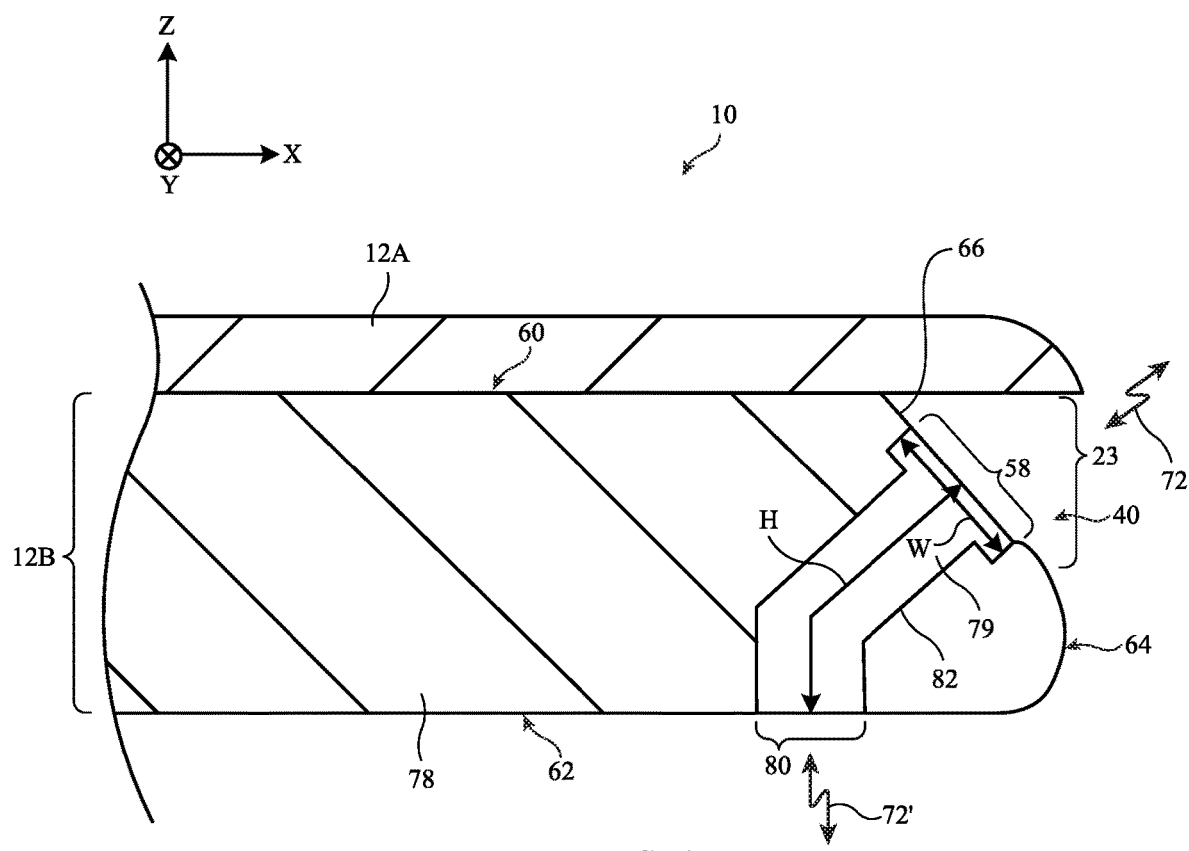
FIG. 6 is a cross-sectional side view of an illustrative electronic device having a finger-receiving recess with a radiating slot that extends to an additional opening through the electronic device in accordance with some embodiments.

If desired, slot 58 may extend from angled surface 66 to an opening in lower metal wall 62 (e.g., as a three-dimensional radiating slot). FIG. 6 is a cross-sectional side view showing one example of how slot 58 may extend from angled surface 66 to an opening in lower metal wall 62. The antenna feed for antenna 40 has been omitted for the sake of clarity.

As shown in FIG. 6, lower metal wall 62 of lower housing 12B may have an opening 80. Opening 80 is sometimes also referred to herein as gap 80, notch 80, slot 80, or aperture 80. Lower housing 12B may include conductive structures 78 (sometimes referred to herein as conductors 78 or conductor 78). Conductive structures 78 may include internal conductive structures 70 (FIG. 5), portions of lower metal wall 62, portions of metal sidewall 64, and/or portions of upper metal wall 60. Antenna 40 may include a tunnel 79 that extends from slot 58 at angled surface 66 (finger scoop 23), through conductive structures 78, to opening 80 in lower metal wall 62. Tunnel 79 may have a height H extending from slot 58 at angled surface 66 to opening 80 (e.g., orthogonal to the longitudinal axis L of slot 58 as shown in FIG. 4 and orthogonal to width W). Tunnel 79 may sometimes also be referred to herein as a tunnel portion of a three-dimensional radiating slot 58. Tunnel 79 is sometimes also referred to herein as cavity 79, waveguide 79, or shaft 79.

Tunnel 79 may be a linear tunnel from slot 58 at angled surface 66 to opening 80 or may be a bent (non-linear) tunnel extending from slot 58 to opening 80 along at least a first axis and a second axis non-parallel to the first axis (as shown in the example of FIG. 6). Antenna 40 may be fed across opening 80, at any desired location along tunnel 79, and/or across slot 58 at angled surface 66. Tunnel 79 may propagate the radio-frequency signals transmitted and/or received by the antenna feed of antenna 40 down the length of tunnel 79 and through opening 80 and/or up the length of tunnel 79 and through slot 58 at angled surface 66. In other words, tunnel 79 may form a radio-frequency waveguide for the signals conveyed by antenna 40. In this way, tunnel 79 may allow antenna 40 to also convey radio-frequency signals through an additional field of view out the bottom of lower housing 12B (as shown by arrow 72').

The example of FIG. 6 is merely illustrative. In general, tunnel 79 may have any desired shape having any desired number of straight and/or curved tunnel segments. Tunnel 79 may have any desired number of curved and/or straight edges (walls). Tunnel 79 may have the same width W as slot 58 at angled surface 66 or may have a different (e.g., narrower) width. If desired, tunnel 79 may have multiple widths at different points along its height (e.g., a tapered width). A dielectric material such as dielectric material 68 (FIG. 5) may fill opening 80. If desired, a dielectric material may fill some or all of tunnel 79 (e.g., from opening 80 to slot 58 at angled surface 66). If desired, a dielectric cover layer (not shown) may overlap opening 80 at the exterior of device 10.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. A laptop computer comprising:
   a lower housing having a keyboard;
   an upper housing coupled to the lower housing by a hinge and having a display;
   a finger scoop on the lower housing; and
   an antenna having a radiating slot in the finger scoop.

2. The laptop computer of claim 1, wherein the hinge has a hinge axis and the radiating slot has a longitudinal axis parallel to the hinge axis.

3. The laptop computer of claim 1, wherein the antenna has a first antenna feed terminal coupled to a first side of the radiating slot and a second antenna feed terminal coupled to a second side of the radiating slot opposite the first side.

4. The laptop computer of claim 3, wherein the lower housing has a cavity overlapping the radiating slot.

5. The laptop computer of claim 4, further comprising:
   a transmission line that extends through the cavity and that is coupled to the first and second antenna feed terminals.

6. The laptop computer of claim 4, wherein the cavity is configured to reflect radio-frequency signals conveyed by the antenna.

7. The laptop computer of claim 4, wherein the cavity is configured to contribute a resonant electromagnetic mode to a response of the antenna.

8. The laptop computer of claim 1, further comprising:
   a dielectric material in the radiating slot.

9. The laptop computer of claim 1, wherein the radiating slot lies in curved surface.

10. The laptop computer of claim 1, wherein the lower housing comprises:
    conductive structures;
    an opening in the conductive structures at an exterior of the lower housing; and
    a waveguide that extends from the radiating slot to the opening through the conductive structures.

11. A laptop computer comprising:
    a lower housing having an upper metal wall, a lower metal wall, and a metal sidewall that couples the upper metal wall to the lower metal wall;
    a recess in the metal sidewall and extending from the upper metal wall;
    an upper housing coupled to the lower housing by a hinge, wherein the upper housing is rotatable between an open position and a closed position, the recess having a surface oriented at a non-parallel and non-perpendicular angle relative to a lateral surface of the upper housing when the upper housing is in the closed position; and
    an antenna having a slot in the surface of the recess.

12. The laptop computer of claim 11, the hinge having a hinge axis and the slot having a longitudinal axis parallel to the hinge axis.

13. The laptop computer of claim 12, the antenna comprising an antenna feed coupled to the surface across the slot.

14. The laptop computer of claim 11, wherein the upper metal wall, the lower metal wall, and the metal sidewall define a cavity within the lower housing, the slot overlapping the cavity.

15. The laptop computer of claim 11, further comprising:
    an opening in the lower metal wall of the lower housing;
    conductive structures in the lower housing; and
    a tunnel that extends from the slot, through the conductive structures, to the opening in the lower metal wall of the lower housing.

16. The laptop computer of claim 15, wherein the slot is configured to transmit radio-frequency signals and the tunnel is configured to propagate at least some of the radio-frequency signals to the opening.

17. The laptop computer of claim 15, wherein the tunnel comprises a linear tunnel extending from the slot to the opening.

18. The laptop computer of claim 15, wherein the tunnel has a first segment extending from the slot along a first axis and a second segment extending from the first segment to the opening along a second axis non-parallel to the first axis.

19. An electronic device comprising:
    a housing having an upper housing portion that contains a display and having a lower housing portion, wherein the lower housing portion has opposing first and second conductive walls and a third conductive wall that couples the first conductive wall to the second conductive wall;
    a hinge that couples the upper housing portion to the lower housing portion, the upper housing portion being rotatable between an open position and a closed position;
    a notch in the lower housing portion where the first conductive wall meets the third conductive wall, wherein a lateral surface of the upper housing overlaps the notch when the upper housing is in the closed position; and
    an antenna having a radiating slot in the notch.

20. The electronic device of claim 19, wherein the radiating slot lies in a surface oriented at a non-perpendicular and non-parallel angle relative to the lateral surface of the upper housing when the upper housing is in the closed position.

* * * * *